United States Patent
Cheng et al.

(10) Patent No.: US 10,563,027 B2
(45) Date of Patent: *Feb. 18, 2020

(54) POLYETHYLENE FILMS AND PRODUCTION OF SUCH FILMS

(71) Applicant: ExxonMobil Chemical Patents Inc., Baytown, TX (US)

(72) Inventors: Jianya Cheng, Kingwood, TX (US); Adriana S. Silva, Houston, TX (US); Peijun Jiang, Katy, TX (US); Wen Li, Houston, TX (US); Alexander I. Norman, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/054,827

(22) Filed: Aug. 3, 2018

(65) Prior Publication Data
US 2019/0135996 A1 May 9, 2019

Related U.S. Application Data

(62) Division of application No. 15/303,784, filed as application No. PCT/US2015/030844 on May 14, 2015, now Pat. No. 10,077,344.

(60) Provisional application No. 62/004,278, filed on May 29, 2014.

(30) Foreign Application Priority Data

Jul. 1, 2014 (EP) .................................... 14175210

(51) Int. Cl.
*C08L 23/06* (2006.01)
*C08J 5/18* (2006.01)
*B29C 48/10* (2019.01)
*B29C 48/00* (2019.01)
*B29C 48/88* (2019.01)
*C08L 23/08* (2006.01)
*C08F 210/18* (2006.01)
*B29K 9/00* (2006.01)
*B29K 409/00* (2006.01)
*C08F 4/659* (2006.01)
*C08F 4/6592* (2006.01)

(52) U.S. Cl.
CPC .............. *C08J 5/18* (2013.01); *B29C 48/022* (2019.02); *B29C 48/10* (2019.02); *B29C 48/913* (2019.02); *C08F 210/18* (2013.01); *C08L 23/06* (2013.01); *C08L 23/0815* (2013.01); *B29K 2009/00* (2013.01); *B29K 2023/06* (2013.01); *B29K 2409/00* (2013.01); *C08F 4/65908* (2013.01); *C08F 4/65927* (2013.01); *C08J 2323/06* (2013.01); *C08J 2447/00* (2013.01); *C08L 2203/16* (2013.01); *C08L 2205/025* (2013.01)

(58) Field of Classification Search
CPC ..... B29C 48/913; B29C 48/022; B29C 48/10; C08F 210/18; C08F 210/14; C08F 236/20; C08F 2500/12; C08F 2500/17; C08F 2500/26; C08F 4/65927; C08L 23/16; C08L 23/0815; C08L 23/06; C08L 2409/00; C08L 2205/025; C08L 2203/16; C08J 5/18; C08J 2323/06; C08J 2447/00; B29K 2009/00; B29K 2409/00; B29K 2023/06

See application file for complete search history.

(56) References Cited

U.S. PATENT DOCUMENTS

| | | |
|---|---|---|
| 3,568,252 A | 3/1971 | Masuda et al. |
| 3,891,790 A | 6/1975 | Kierstead |
| 4,565,847 A | 1/1986 | Bahl et al. |
| 4,735,988 A | 4/1988 | Takada et al. |
| 4,784,885 A | 11/1988 | Carespodi |
| 5,670,595 A | 9/1997 | Meka et al. |
| 6,111,019 A | 8/2000 | Arjunan et al. |
| 6,114,457 A | 9/2000 | Markel et al. |
| 6,147,180 A | 11/2000 | Markel et al. |
| 6,300,451 B1 | 10/2001 | Mehta et al. |
| 6,355,757 B2 | 3/2002 | Garcia-Franco et al. |
| 6,391,998 B1 | 5/2002 | Garcia-Franco et al. |
| 6,417,281 B1 | 7/2002 | Garcia-Franco et al. |
| 6,509,431 B1 | 1/2003 | Duttweiler et al. |
| 6,734,265 B1 | 5/2004 | Dekmezian et al. |
| 6,870,010 B1 | 3/2005 | Lue et al. |
| 7,687,580 B2 | 3/2010 | Lohse et al. |

(Continued)

FOREIGN PATENT DOCUMENTS

| | | |
|---|---|---|
| CN | 102863685 A | 1/2013 |
| CN | 103739061 A | 7/2014 |

(Continued)

*Primary Examiner* — Nathan M Nutter
(74) *Attorney, Agent, or Firm* — Kevin M. Faulkner; Leandro Arechederra, III (57) ABSTRACT

A method of forming a finished film comprising extruding a molten polyethylene comprising a diene terpolymer modifier through a die opening to form a film, wherein the diene-terpolymer modifier is a terpolymer comprising ethylene-derived units, $C_3$ to $C_{10}$ α-olefin derived units, and diene-derived units; causing the film to progress in a direction away from the die opening; cooling the film at a distance from the die opening, the distance adjusted to allow relaxation of the molten polyethylene prior to solidification and/or crystallization upon cooling; and isolating a finished film therefrom. Desirably, the polyethylene is a linear low density polyethylene, and the die and cooling is suitable for forming a blown film.

5 Claims, 5 Drawing Sheets

(56) References Cited

U.S. PATENT DOCUMENTS

| | | | |
|---|---|---|---|
| 9,340,664 B2 * | 5/2016 | Shirodkar et al. | C08L 23/06 |
| 10,124,528 B2 * | 11/2018 | Ravishankar et al. | B29C 55/28 |
| 2004/0118592 A1 | 6/2004 | Pehlert | |
| 2005/0154136 A1 | 7/2005 | Dharia et al. | |
| 2007/0260016 A1 | 11/2007 | Best et al. | |
| 2008/0033112 A1 | 2/2008 | Squire et al. | |
| 2008/0179780 A1 | 7/2008 | Broadus et al. | |
| 2008/0258325 A1 | 10/2008 | Zimmermann | |
| 2011/0042380 A1 | 2/2011 | Tsou et al. | |
| 2013/0090433 A1 | 4/2013 | Jiang et al. | |
| 2017/0198124 A1 | 7/2017 | Li et al. | |

FOREIGN PATENT DOCUMENTS

| | | |
|---|---|---|
| EP | 0159102 A | 10/1985 |
| EP | 0 544 098 | 6/1993 |
| JP | H0639918 A | 2/1994 |
| JP | 06-143412 | 5/1994 |
| JP | H06136194 A | 5/1994 |
| JP | H06136197 A | 5/1994 |
| JP | H07309983 A | 11/1995 |
| JP | 2002179855 A | 6/2002 |
| JP | 2011-218646 | 11/2011 |
| JP | 2011231260 A | 11/2011 |
| WO | 2013/043796 A | 3/2013 |

* cited by examiner

POLYETHYLENE FILMS AND PRODUCTION OF SUCH FILMS

CROSS-REFERENCE TO RELATED APPLICATIONS

This application is a divisional of and claims priority to U.S. Ser. No. 15/303,784, filed Oct. 13, 2016, now allowed, which is a National Stage Phase Application of International PCT Application No. PCT/US2015/030844, filed May 14, 2015, which claims priority to and the benefit of U.S. Ser. No. 62/004,278, filed May 29, 2014 and EP 14175210.5 filed Jul. 1, 2014, each of which is incorporated by reference.

FIELD OF THE INVENTION

The present invention relates to polyethylene films and the process used to form such films, and in particular, an improved blown film process and the films that result therefrom.

BACKGROUND OF THE INVENTION

The blown film technique is an important means by which polyethylene films are manufactured. A major use of such films is in making bags, where the films can be formed as continuous cylinders then crimped to close one end. The process to blow polyethylenes into such films however is complex, requiring a balance between processability (flowability and melt strength) on the one hand and mechanical properties (e.g., Tensile Strength, Modulus) on the other. Improvements in both the materials used to make such films, and the process itself, can synergistically make blown films a more attractive commercial process. The inventors here have found desirable materials and methods of forming blown films.

Methods of cooling films extruded through a ring die have been discussed in U.S. Pat. No. 3,891,790. Other references of interest include: U.S. Pat. Nos. 7,687,580; 6,509,431; 6,355,757; 6,391,998; 6,417,281; 6,300,451; 6,114,457; 6,734,265; 6,147,180; 6,870,010; and 5,670,595; 3,568,252; WO 2007/067307; WO 2002/085954; US 2008/179780; US 2007/0260016; EP 0 544 098 A; and Guzman, et al., 56(5) AIChE Journal, 1325-1333 (2010).

SUMMARY OF THE INVENTION

Disclosed herein in part is a method of forming a finished film comprising extruding a molten polyethylene comprising a diene terpolymer modifier through a die opening to form a film, wherein the diene-terpolymer modifier is a terpolymer comprising ethylene-derived units, $C_3$ to $C_{10}$ α-olefin derived units, and diene-derived units; causing the film to progress in a direction away from the die opening, preferably in the molten state, partially molten, or softened due to some partial cooling; cooling the film at a distance from the die opening, the distance adjusted to effect the properties of the film; and isolating a finished film therefrom.

Also disclosed is a polyethylene blown film having a MD Tensile Strength of the finished film is within a range from 6000 psi (41 MPa) or 8000 psi (55 MPa) to 16,000 psi (110 MPa) comprising (or consisting essentially of, or consisting of) a linear low density polyethylene having a density within the range from 0.850 g/cm³ to 0.930 g/cm³ and within the range from 0.10 wt % to 10 wt % of a diene-terpolymer modifier; wherein the diene terpolymer modifier comprises within a range from 0.01 wt % to 10.0 wt % diene derived units, and 1.0 wt % to 20 wt % of $C_4$ to $C_{10}$ α-olefin derived units based on the weight of the diene terpolymer, wherein the diene-terpolymer modifier has: a $g'_{vis}$ of less than 0.90; an $M_w$ within a range of from 70,000 g/mol to 300,000 g/mol; an $M_w/M_n$ within the range of from 3.0 to 12; and an to $M_z/M_n$ of greater than 14.0.

DETAILED DESCRIPTION

The inventors have surprisingly found that the addition of a minor amount of a diene-terpolymer modifier ("DTP") with a polyethylene, especially LLDPE, in combination with a film process with a means for cooling the forming film that provides some distance from the die from which the film emanates, yields significant enhancement of a number of the finished film's properties and the rate at which it can be produced. In this film forming process, a cooling device such as an air ring, for example, is elevated (moved a distance from the die) allowing for more effective cooling of the forming film. It is believed that this allows the polymer molecules to "relax" in the melt for a period of time after the melt exits the die, and thus providing the distance allows such relaxation prior to crystallization of the polyethylene. In the molten or semi-molten state, the molten polymer is stretched in both the TD and MD directions after it reaches the cooling device (e.g., elevated air ring). Then the film is subjected to effective cooling from, for example, both a trip-lip air ring and internal bubble cooling, common in blown film processes. It is evidenced that this new process and DTP addition provide a balanced MD-TD orientation; hence, the film exhibits enhanced physical properties. Desirably, the combination of DTP and separation between the cooling and the die also creates a desired crystal size and morphology, which result in the enhanced stiffness and excellent optical property.

Process to Produce a Film

The invention can be described in any embodiment as a method of forming a finished film comprising extruding a molten polyethylene comprising a diene terpolymer modifier through a die opening to form a film, wherein the diene-terpolymer modifier is a terpolymer comprising ethylene-derived units, $C_3$ to $C_{10}$ α-olefin derived units, and diene-derived units; causing the film to progress in a direction away from the die opening, preferably in the molten state, partially molten, or softened due to some partial cooling; cooling the molten polyethylene in the form of a film at a distance from the die opening, the distance adjusted to effect the properties of the film (e.g., to allow relaxation of the molten polyethylene prior to solidification and/or crystallization upon cooling); and isolating a finished film therefrom.

By "extruding" what is meant is that the polymer and/or polymer blend if formed into a melt such as by heating and/or sheer forces and is forced to blend with other polymers and/or components (e.g., the polyethylene and the modifier) and is then forced out of a die in a desirable form or shape to effect the form or shape of the emanating polymer melt, such as in a film, most preferably a tubular film. Most any type of apparatus will be appropriate to effect "extrusion" such as a single or twin-screw extruder, or other melt-blending device as is known in the art and that can be fitted with a suitable die.

By "at a distance from the die", what is meant is that the "cooling device", such as a cooling ring that blows air on the forming film, is located at least 1 or 2 or 4 or 8 cm from the die (or other distance as described herein) preferably measured from the top or outer edge of the die to the base of the cooling device.

By "causing the film to progress", what is meant is that the film forming from the die opening from hardening polyethylene is pulled or pushed mechanically or by some other means such as by air pressure (negative or positive) away from the die to create a continuous finished film.

In a typical process, a polyethylene melt is extruded through a die such as an annular slit die, usually vertically, to form a thin walled tube. Cooling preferably in the form of air is introduced via a ring in the center of the die to blow up the tube like a balloon. Cooling could also be effectuated by other means, and the air may be nitrogen/oxygen or other gases or mixtures of gases or liquids. Mounted on top of the die, a high-speed air ring blows onto the hot film to cool it. In the present invention, the cooling occurs at some distance "H" (see FIG. 1B) from the die, which is at least 1 cm as defined above. The tube of film can then continue upwards (see arrows in FIGS. 1A and 1B), continually cooling, until it may pass through nip rolls where the tube is flattened to create what is known as a "lay-flat" tube of film. This lay-flat or collapsed tube can then be taken back down the extrusion "tower" via more rollers. On higher output lines, the air inside the bubble is also exchanged. This is known as IBC (Internal Bubble Cooling).

In any case, the lay-flat film is then either kept as such or the edges of the lay-flat are slit off to produce two flat film sheets and wound up onto reels. Articles such as bags can be made from such lay-flat films. In this regard, if kept as lay-flat, the tube of film is made into bags by sealing across the width of film and cutting or perforating to make each bag. This is done either in line with the blown film process or at a later stage.

Preferably, the expansion ratio between die and blown tube of film would be 1.5 to 4 times the die diameter. The drawdown between the melt wall thickness and the cooled film thickness occurs in both radial and longitudinal directions and is easily controlled by changing the volume of air inside the bubble and by altering the haul off speed. This gives blown film a better balance of properties than traditional cast or extruded film which is drawn down along the extrusion direction only.

Figure 1A:
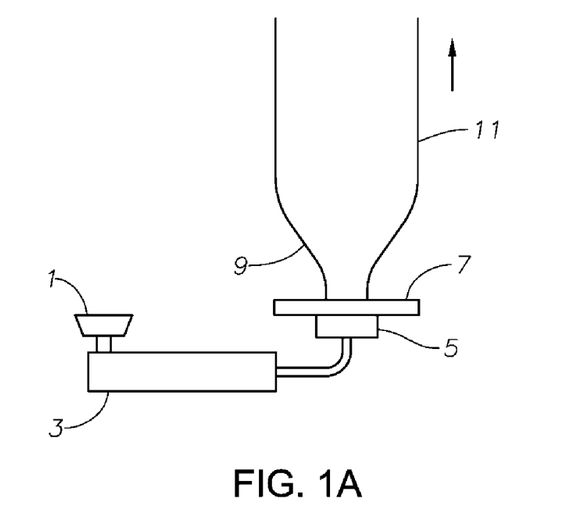
FIG. 1A is a diagrammatic depiction of a blown film process.

A typical prior art blown film process is described with reference to FIG. 1A, where the ingredients used to form the film are added in any desirable form, preferably as granules, in hopper 1, which feeds the material to the extruder 3, where the materials are melt blended at a desirable temperature through shear forces and/or heating. The molten material is then fed, with or without filtering, to a die 5 which is also heated to a desired temperature and then forced from the die in the direction of the arrow in FIG. 1A. The cooling of the forming film takes place via 7, preferably a device that blows air that is at least 10 or 20° C. cooler than the surrounding air. The air preferably blows against the outside of the film, most preferably around the entire circumference formed by the film. There is also air blown internally that both cools and blows the film up like a balloon. The film 9 starts to expand where it eventually cools and crystallizes to form finished film 11.

Figure 1B:
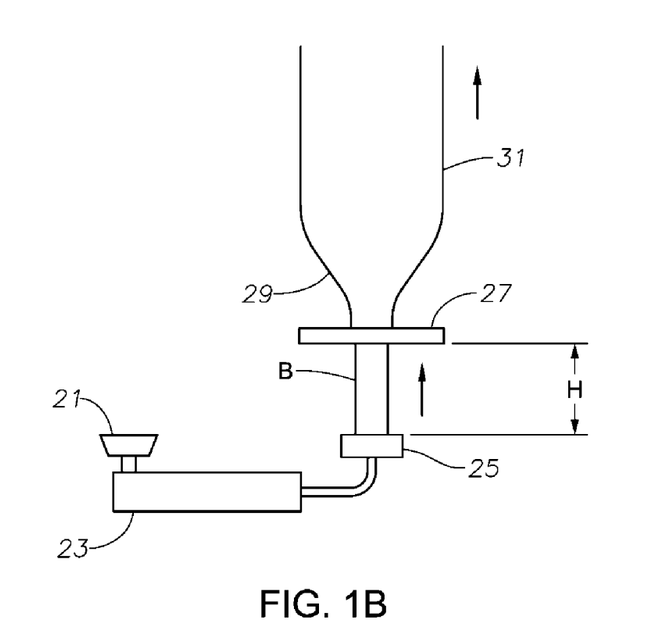
FIG. 1B is a non-limiting diagrammatic depiction of the inventive process, wherein "H" is the distance between the cooling device and the die.

The inventive process is described with reference to FIG. 1B, where the actual apparatus useful in such a process shares many of the features in FIG. 1A. Materials used to form the film is fed into the extruder 23 via hopper 21, where the materials are melt blended and transferred in the molten state to the die 25. Here, unlike in the prior art process, the forming film "B" is allowed to form in the direction of the arrow for a time and distance "H" until reaching the cooling device 27, again preferably a device that blows air that is at least 10 or 20° C. cooler than the surrounding air. The medium, such as air, around the forming film B may be heated or otherwise moderated so as to facilitate relaxation of the film in its molten or softened state during the time spent in the H distance. The forming film B desirably spends from 0.5 or 1 or 5 seconds to 10 or 20 seconds in the zone described by the distance H in FIG. 1B. Preferably, the cooling air is at a temperature within the range from 5 or 10° C. to 15 or 20 or 25, or 30° C.; and preferably the surrounding temperature in the area of the forming film 29 is within a range from 20 or 30° C. to 50 or 60° C. The film then expands and cools in the region 29 as it is cooled by, for example, cooler air blowing from 27, where a finished film 31 is eventually isolated by various means such as by rollers, nips, etc.

The "distance" can be any distance from the die, preferably measured from the top or outer edge of the die to the base of the cooling device. The optimal distance is one that allows for adequate relaxation of the molten polyethylene before it crystallizes into the finished film. In any embodiment, the distance is at least 1 or 2 or 4 or 8 cm from the die; or within a range of from 1, or 2, or 4, or 8 cm to 50 cm, or 60 cm, or 80 cm, or 3 meters. Stated another way, the distance can be described as the ratio of H/D and is within a range from 0.05, or 0.1 or 0.5 or 1 to 2 or 3 or 4 or 5, or 10, or 15, or 20, where the H is the distance from die exit to the "cooling", for example, a cooling ring, and D is the diameter of a die (H and D are the same units). The "cooling" is preferably provided by air blown around the film. Air may also be blown inside the film if the finished film is a tube, and most preferably there is air blown inside the film-tube. Such air will emanate from the center of the die, near or at the die opening, and will maintain the temperature in the vicinity "H" described above.

Preferably, the die used in the formation of the films herein is designed such that the die opening, through which the molten polyethylene emanates, is in the form of a ring and the molten polyethylene emanating therefrom is in the form of a continuous tube. The "Maximum Die Rate" is a normalized extrusion rate by die size which is commonly used in blow film industry. The Maximum Die Rate as used herein is expressed as following: Maximum Die Rate [lb/in-hr]=Extrusion Rate [lb/hr]/Die Circumference [inch]. Another definition of the Maximum Die Rate is expressed as following: Maximum Die Rate [kg/mm-hr]=Extrusion Rate [kg/hr]/Die Diameter [mm]. The Maximum Die Rate at which the film is formed is at least 13, or 15, or 18 lb/in-hr (0.73, or 0.84, or 1.01 kg/mm-hr), or within a range from 13, or 15, or 18, or 22 lb/in-hr to 26 or 30 or 40 lb/in-hr (0.73, or 0.84, or 1.01, or 1.23 kg/mm-hr to 1.46 or 1.69 or 2.25 kg/mm-hr); and preferably the Maximum Rate of extrusion is within a range from 350 lb/hr (159 kg/hr) to 500 lb/hr (227 kg/hr). Note that for the "Maximum Die Rate" in the English unit, the die dimension is the die circumference, while in metric unit, the die dimension is the die diameter.

Polyethylene Blend

The inventive method in any embodiment includes the extrusion of a molten composition which is a polyethylene blend comprising at least one polyethylene and at least one DTP. The "polyethylene" that is useful in making films is preferably any type of homo- or co-polymer derived from ethylene and $C_3$ to $C_{10}$ α-olefins. Preferably, the polyethylene is a linear low density polyethylene having a density within the range from 0.850 or 0.900 or 0.905 g/cm$^3$ to 0.915 or 0.925 or 0.930 g/cm$^3$. Also the linear low density polyethylene preferably has a melt index (ASTM D 1238 190° C., 2.16 kg) within the range from 0.20 or 0.40 or 0.60 or 0.80 g/10 min to 1.20 or 1.40 or 1.60 or 2.00 or 4.00, or 8.0, or 10.0 g/10 min.

Preferably, the polyethylene comprises within the range from 0.10 or 0.50 wt % to 2.0 or 3.0 or 6.0 or 10 wt % of a diene-terpolymer (DTP) modifier. The diene-terpolymer modifier is a terpolymer comprising ethylene-derived units, $C_3$ to $C_{10}$ α-olefin derived units, and diene-derived units; wherein the diene is preferably an alpha-omega linear diene. Preferably, the diene terpolymer comprises within a range from 0.01 wt % to 10.0 wt % diene derived units, and 1.0 wt % to 20 wt % of $C_4$ to $C_{10}$ α-olefin derived units based on the weight of the diene terpolymer, wherein the diene terpolymer has a g'$_{vis}$ of less than 0.90; an $M_w$ within a range of from 70,000 g/mol to 300,000 g/mol; an $M_w/M_n$ within the range of from 3.5 to 12; and an $M_z/M_n$ of greater than 7.0.

The DTP modifier can be described by a number of features and properties. It primarily is comprised of ethylene-derived units, but will also comprise within the range from 1.0 or 2.0 or 5.0 wt % to 12 or 16 or 20 wt % of a $C_4$ to $C_{10}$ α-olefin derived units based on the weight of the DTP modifier, most preferably 1-butene, 1-hexene or 1-octene. The DTP modifier also comprises within the range from 0.01 or 0.05 or 1.0 wt % to 5.0 or 8.0 or 10.0 wt % diene derived units, preferably alpha-omega dienes, based on the weight of the DTP modifier. The remainder of the DTP is comprised of ethylene-derived units. The dienes may preferably be selected from the group consisting of 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene, tetrahydroindene, norbornadiene also known as bicyclo-(2.2.1)-hepta-2,5-diene, dicyclopentadiene, 5-vinyl-2-norbornene, 1,4-cyclohexadiene, 1,5-cyclooctadiene, 1,7-cyclododecadiene derived units, and combinations thereof. More preferably, the diene is selected from 5-vinyl-2-norbornene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene derived units; and most preferably selected from 1,7-octadiene and 1,9-decadiene derived units. The DTP modifier preferably has a density within the range of from 0.890 or 0.905 or 0.910 or 0.915 g/cm$^3$ to 0.920 or 0.925 g/cm$^3$.

The properties of the DTP modifier can of course vary depending on the exact process used to make it, but preferably the DTP modifier has the following measurable features. Certain GPC (Light Scattering (LS) or Differential Refractive Index (DRI)) measurable features include the following: The weight average molecular weight (Mw) is preferably within a range of from 70,000 or 80,000 or 100,000 g/mol to 140,000 or 160,000 or 180,000 or 200,000 or 300,000 g/mol. The number average molecular weight (Mn) is preferably within a range of from 15,000 or 20,000 or 30,000 g/mol to 35,000 or 40,000 or 50,000 or 80,000 g/mol. The z-average molecular weight (Mz) is preferably greater than 400,000 or 500,000 or 800,000 g/mol, and more preferably within a range of from 300,000 or 400,000 or 500,000 or 800,000 g/mol to 1,000,000 or 1,200,000 or 1,500,000 or 2,000,000 g/mol. Finally, the DTP modifier has a molecular weight distribution (Mw/Mn) within the range of from 3.0 or 3.2 to 6.0 or 7.0 or 8.0 or 10.0 or 12.0; and an Mz/Mn value of greater than 14 or 16 or 18 or 20, or within a range of from 14 or 16 or 18 to 24 or 28 or 30 or 36. For the GPC data, DRI (differential refractive index) method is preferred for Mn, while LS (light scattering) is preferred for Mw and Mz.

Certain DSC measurable properties include the following: The DTP modifier preferably has a melting point temperature ($T_m$) within the range of from 90 or 95 or 100 or 110° C. to 115 or 125 or 130° C. The DTP modifier also preferably has a crystallization temperature ($T_c$) within the range of from 75 or 80 or 85 or 90° C. to 110 or 115 or 120 or 125° C. The DTP modifier also preferably has a heat of fusion ($H_f$) within the range of from 70 or 75 or 80 J/g to 90 or 95 or 100 or 110 or 120 or 130 or 140 J/g.

Certain melt flow properties of the DTP modifier include the following: The DTP modifier preferably has a melt index (190° C./2.16 kg, "$I_2$") of 15 g/10 min or less, 10 g/10 min or less, 5 g/10 min or less or 2 g/10 min or less, or more preferably within the range of from 0.10 or 0.20 or 0.30 or 0.80 or 1.0 g/10 min to 4 or 5 or 6 or 8 g/10 min. The DTP modifier has a wide ranging high load melt index ($I_{21}$), but preferably has a high load melt index (190° C./21.6 kg, "$I_{21}$") within the range of from 0.10 or 0.20 or 0.30 or 0.80 or 1.0 g/10 min to 4 or 5 or 6 or 8 or 20 or 40 or 60 or 80 or 100 or 140 or 180 or 200 g/10 min. The DTP modifier has a melt index ratio ($I_{21}/I_2$) within a range of from 20 or 25 or 30 to 70 or 75 or 80 or 85 or 90.

Certain dynamic properties of the DTP modifier include the following: The DTP modifier preferably has a Complex Viscosity at 0.1 rad/sec and a temperature of 190° C. within the range of from 20,000, or 50,000, or 100,000, or 150,000, Pa·s to 300,000, or 350,000, or 400,000, or 450,000 Pa·s. The DTP modifier preferably has a Complex Viscosity at 100 rad/sec and a temperature of 190° C. within the range of from 500 or 700 Pa·s to 5,000 or 8,000 or 10,000 or 15,000 Pa·s. Also, the DTP modifier preferably has a Phase Angle at the Complex Modulus of 10,000 Pa within the range of from 10 or 15 or 20 or 25° to 45 or 50 or 55 or 60° when the complex shear rheology is measured at a temperature of 190° C. The DTP modifier preferably has a Phase Angle at the Complex Modulus of 100,000 Pa within the range of from 10 or 15° to 25 or 35 or 45° when the complex shear rheology is measured at a temperature of 190° C.

Finally, the DTP modifier has a level of branching indicated by the measured value of the branching index "g'$_{vis}$". The value for g'$_{vis}$ is preferably less than 0.90 or 0.80 or 0.75 or 0.60, or within a range of from 0.30 or 0.40 or 0.60 to 0.70 or 0.90. A polyethylene is "linear" when the polyethylene has no long chain branches, typically having a g'$_{vis}$ of 0.97 or above, preferably 0.98 or above. "Linear polyethylenes" preferably include ethylene polymers having a g'$_{vis}$ of 0.95 or 0.97 or more, and as further described herein. Thus, a lower value for $g'_{vis}$ indicates more branching. The methods for measuring $g'_{vis}$ are described in U.S. Ser. No. 13/851,769 filed Mar. 27, 2013; U.S. Ser. No. 13/851,752 filed Mar. 27, 2013; U.S. Ser. No. 13/800,098, filed Mar. 13, 2013; and U.S. Ser. No. 13/623,242, filed Sep. 20, 2012.

Finished Film

Figure 2:
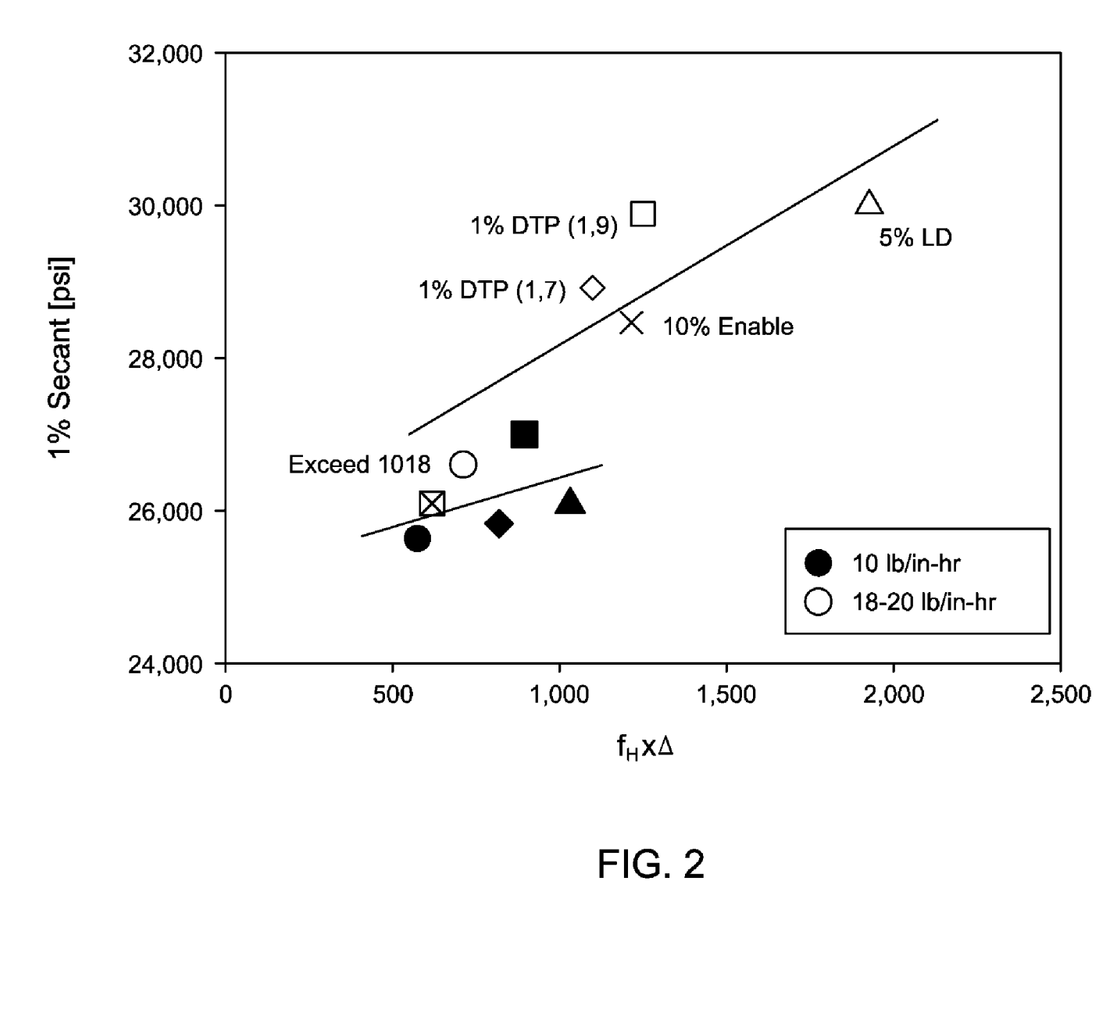
FIG. 2 is a plot of the Elmendorf Tear (MD) as a function of the Herman orientation function, % crystallinity ($\chi$) (chi) and inter-lamellar spacing (Δ) (delta) of the blown films.
Figure 3:
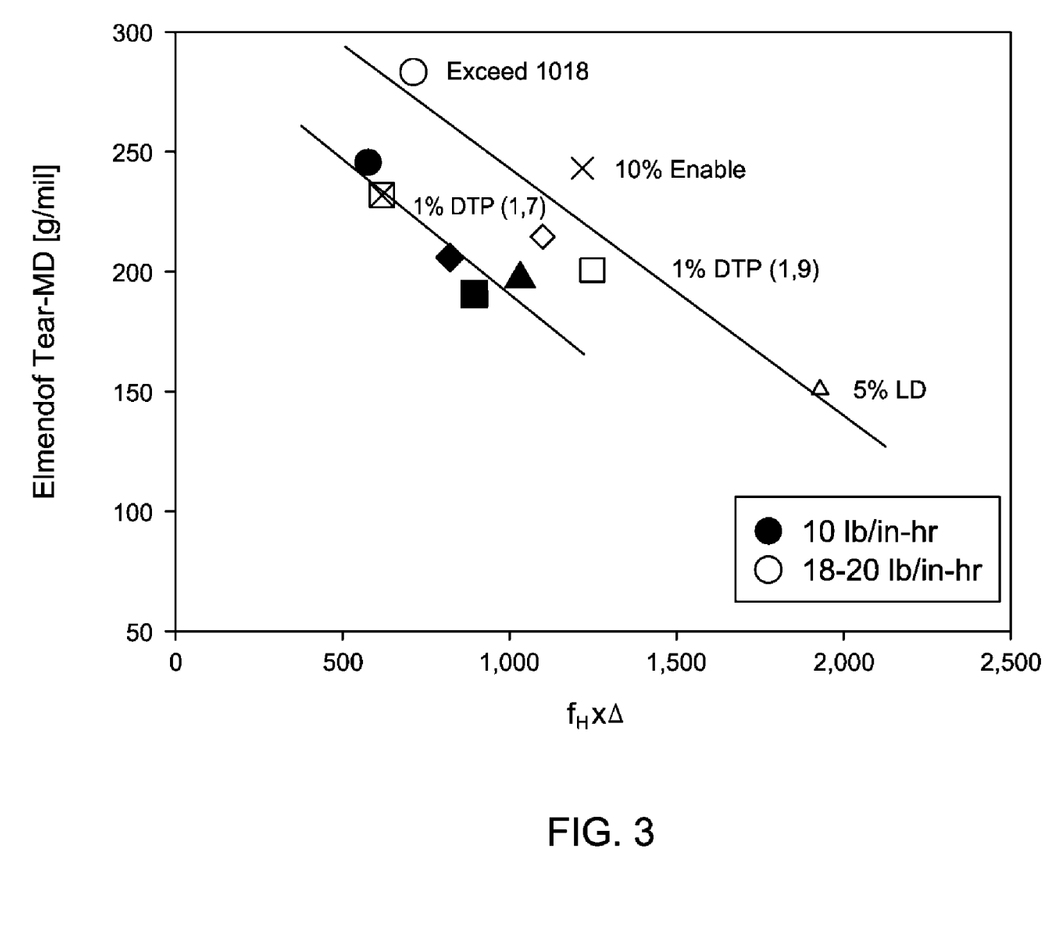
FIG. 3 is a plot of the 1% Secant Flexural Modulus as a function of the Herman orientation function and % crystallinity ($\chi$) and inter-lamellar spacing (Δ) of the blown films.

The improvement resulting from the process can be seen in the lamellar structure of the inventive films. This is reflected in SAXS/WAXS data acquired on the finished, blown films. This technique yields information pertaining to the crystal structure of the materials. This can be quantified in the following relationship(s), wherein the films ETMD and SCMD are defined as follows:

$$\text{ETMD}+0.103 f_H \cdot \chi \Delta > 200 \text{ (g/mil); or}$$

$$\text{ETMD}+0.103 f_H \cdot \chi \Delta > 240 \text{ (g/mil); or}$$

$$\text{ETMD}+0.103 f_H \cdot \chi \Delta > 280 \text{ (g/mil);}$$

either separate from, or in conjunction with the following relationships $$\text{SCMD}-2.62 f_H \cdot \chi \Delta > 21{,}000 \text{ (psi); or}$$

$$\text{SCMD}-2.62 f_H \cdot \chi \Delta > 22{,}000 \text{ (psi); or}$$

$$\text{SCMD}-2.62 f_H \cdot \chi \Delta > 23{,}000 \text{ (psi);}$$

wherein "ETMD" is MD Elmendorf tear (g/mil); SCMD is the MD 1% Secant (psi); $f_H$ is the Herman Orientation Function (lamella); $\chi$ is percent crystallinity (%); and $\Delta$ is inter-lamellar spacing (Å). Ideally, the inventive process is such that the properties of the forming film can be adjusted by the amount of modifier added to the polyethylene and/or the amount of cooling, such as by adjusting the distance of the cooling device from the die. Such changes will influence these relationships, and are depicted graphically in FIGS. 2 and 3. As an example, the inter-lamellar spacing ($\Delta$) of the film may be effected by such adjustments.

Desirably, the % crystallinity ($\chi$) or inter-lamellar spacing ($\Delta$) of the forming film could be measured as described below, and this could be used to aid in adjusting the distance of the cooling and the amount of "relaxation" or crystallization of the forming film. For instance, the distance could be adjusted to keep % crystallinity ($\chi$) of the film in the vicinity of "H" below 50% or 40% or 30% or 20% or 10%, or between 1 or 5 or 10% to 15 or 20 or 30% crystallinity.

Finished films formed from the polyethylene, preferably a LLDPE including the DTP, have many desirable properties. Preferably, the MD Tensile Strength of the finished film is greater than 6000 or 8000 or 9000 psi, or within a range from 6000 psi (41 MPa) or 8000 psi (55 MPa) to 16,000 psi (110 MPa). The finished films preferably have a MD Elongation of greater than 480 or 490 or 500 or 550%, or within a range from 480% to 680%. The Haze (ASTM D1003) of the finished film is preferably less than 6 or 4%. Also, in any embodiment the 1% Average Secant Flexural Modulus ("Flex Mod") of the inventive film is within a range from 25,000 (172), or 28,000 psi (193 MPa) to 35,000 (241), or 40,000 psi (276 MPa) in either the MD or TD; and in any embodiment the Dart Impact is within a range from 400, or 420 g/mil to 500, or 550, or 600, or 650, or 700, or 800, or 900, or 1000 g/mil. Desirably, the finished film has a thickness within the range from 10 or 15 μm to 50 or 75 or 100 or 150 μm.

As mentioned, the finished films have many desirable end uses such as bags and packaging material. The finished films are most preferably "blown films" as is commonly referred to in the art, being cylindrical across its axis, and continuous perpendicular to this axis. The finished films are typically collected and formed into rolls and can be manipulated further by sealing one end and/or cut to form individual articles such as bags.

The improved properties of the films also exist in the unfinished polymer melt that forms the film. Such improvements allow faster line speeds thus debottlenecking of blown film processes. The maximum rate of production, measured for instance as the Maximum Die Rate, at which the film can be produced is controlled in part by the "bubble stability" of the forming film. When the line speed/extrusion rate is over the maximum rate, the bubble formed by the film being blown by air becomes unstable. The bubble stability is related two main factors:

1. Melt strength of the polymer blend: higher the melt strength, higher the maximum rate. The addition of small amount of the diene terpolymer (DTP) enhances the melt strength of the base polyethylene significantly. It has been found that the polyethylene blends with DTP have higher maximum rate than the polyethylenes.

2. Cooling capability of the line: higher cooling capability, higher the maximum rate. It has been found that the ability to move the cooling device for the forming film "downstream" of the die improves its properties and allows faster rates of production.

Typically, the Maximum Die Rate is used to normalize the extrusion rate. For a traditional blown film line having a fixed cooling device at the die, the Maximum Die Rate even using the DTP is about 13 to 13.5 lb/in-hr. But when the inventive process is used, these same blends can be formed at a Maximum Die Rate of at least 18, or 20, or 22 lbs/in-hr.

Thus, in a preferred embodiment, the inventive process results in an inventive polyethylene blown film having a MD Tensile Strength within a range from 6000 psi (41 MPa) or 8000 psi (55 MPa) to 16,000 psi (110 MPa) comprising (or consisting essentially of) a linear low density polyethylene having a density within the range from 0.850 g/cm³ to 0.930 g/cm³ and within the range from 0.10 wt % to 10 wt % of a diene-terpolymer modifier; wherein the diene terpolymer modifier comprises ethylene-derived units and within a range from 0.01 wt % to 10.0 wt % diene derived units, and 1.0 wt % to 20 wt % of $C_4$ to $C_{10}$ α-olefin derived units based on the weight of the diene terpolymer, wherein the diene terpolymer has: a) a $g'_{vis}$ of less than 0.90; b) an $M_w$ within a range of from 70,000 g/mol to 300,000 g/mol; c) an $M_w/M_n$ within the range of from 3.0 to 12; and d) an $M_z/M_n$ of greater than 14.0. The DTP and LLDPE may have other features as described herein.

The various descriptive elements and numerical ranges disclosed herein for the inventive film forming process and the inventive films can be combined with other descriptive elements and numerical ranges to describe the invention(s); further, for a given element, any upper numerical limit can be combined with any lower numerical limit described herein, including the examples in jurisdiction which allow such ranges. The features of the invention are demonstrated in the following non-limiting examples.

EXAMPLES

Test Methods

All test methods are well known in the art and published in US 2013-0090433 A1. The crystallization and melting point temperatures were determined by Differential Scanning calorimetry at 10° C./min. The high load melt flow (I21 or HLMI) parameters are determined per ASTM D 1238 190° C., 21.6 kg. Polymer molecular weight (weight-average molecular weight, Mw, number-average molecular weight, Mn, and z-averaged molecular weight, Mz) and molecular weight distribution (Mw/Mn) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer (SEC-DRI-LS-VIS). For purposes of the claims, SEC-DRI-LS-VIS shall be used. Three Polymer Laboratories PLgel 10 mm Mixed-B columns are used. The nominal flow rate is 0.5 cm$^3$/min and the nominal injection volume is 300 µL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 µm glass pre-filter and subsequently through a 0.1 µm Teflon filter. The TCB is then degassed with an online degasser before entering the SEC.

For ethylene copolymers with alpha-omega-dienes, propylene and $C_4$ to $C_{10}$ α-olefins, the presence of long chain branched structures in the diene terpolymers can be detected using nuclear magnetic resonance spectroscopy (NMR). In $^{13}$C-NMR the modifiers are dissolved in tetrachloroethane-d2 at 140° C. and the spectra are collected at 125° C. Assignments of peaks for ethylene/propylene, ethylene/butene, ethylene/hexene, and ethylene/octene copolymers have been reviewed by James C. Randall in 29(2) *Polymer Reviews*, 201-317 (1989). Assignments for propylene/butene, propylene/pentene, propylene/hexene, propylene/heptene, and propylene/octene are presented by U. M Wahner, et al., (204 *Macromol. Chem. Phys.* 1738-1748 (2003)). These assignments were made using hexamethyldisiloxane as the internal standard. To convert them to the same standard used in the other references, add 2.0 to the chemical shifts. Assignments and a method of measuring decene concentration have been reported for propylene/ethylene/decene terpolymers in Escher, Galland, and Ferreira (41 *J. Poly. Sci., Part A: Poly. Chem.*, 2531-2541 (2003)) and Ferreira, Galland, Damiani, and Villar (39 J. *Poly. Sci, Part A: Poly. Chem.*, 2005-2018 (2001)). The peaks in the $^{13}$C-NMR spectrum of ethylene/norbornadiene copolymers are assigned by Monkkonen and Pakkanen (200 *Macromol. Chem. Phys.*, 2623-2628 (1999)) and Radhakrishnan and Sivaram (200 *Macromol. Chem. Phys.*, 858-862 (1999)). More details are disclosed in US 2013-0090433 A1.

X-Ray Test Methods

Each set of polymer films was analyzed using Small- and Wide-Angle X-ray Scattering (SAXS/WAXS) techniques. The X-ray source was a rotating anode using a Copper target (wavelength=0.154 nm) and a Rigaku SMAX 3000 system. The film was placed in a sample holder at room temperature and the SAXS and WAXS data were collected simultaneously. The SAXS data were collected using a 2D CCD camera which was placed 1.127 m from the sample. The WAXS data were collected using an image plate with a hole in the center (allowing for the scattered X-rays at smaller angles to pass through) and this was placed 0.071 m from the sample.

The 2D X-ray patterns showed that all materials had an inherent degree of molecular orientation: both in the small scale crystal (obtained from WAXS) and in the larger range order which describes how these crystals connect via amorphous non-crystalline chains (obtained from SAXS). The molecular orientation is observed by an anisotropic pattern: the scattering rings are not uniform in intensity; indicative of more molecules being oriented in one specific direction, in our case, this direction is the machine direction (MD). The quantification of this orientation is done by calculating at which angle the greatest intensity lies and to what extent. These angles are then used to compute the Hermans Orientation Function ($f_H$). The $f_H$ can be computed for both SAXS and WAXS data. $f_H$ from SAXS data describes the ordering in the crystal stacks, or lamellae, connected by amorphous polymer chains. $f_H$ from WAXS describes the order of the individual crystallites within the lamellae. A $f_H$ value of zero indicates anisotropy (no order), a value of one (1) indicates perfect parallel alignment to MD, and a value of −0.5 indicates perfect perpendicular alignment to MD. For PE blown film cases positive fractional values of a $f_H$ are obtained, indicating preferential alignment to MD, but not perfect alignment.

The extent of crystallinity (or "relaxation"), or amount of polymer chain that crystallized, can also be calculated from the WAXS data. The 2D images are collapsed to an Intensity versus Angle profile and the two sharp peaks observed for PE are fitted to a Guassian function and the areas are calculated. The ratio of these peak areas to the total area under the scattering profile yields the extent of crystallinity. The full width at half maximum of these crystalline peaks (FWHM), β (beta), can be used to calculate the crystallite size, τ (tau), using the Scherrer equation:

$$\tau = \frac{\kappa \lambda}{\beta \cos \theta}$$

where λ (lambda) is the wavelength of the X-rays and θ (theta) is the scattering angle.

The inter-crystalline (or lamellae) spacing can also be calculated from SAXS from the peak maximum once the 2D SAXS data are collapsed to a 1D intensity versus Angle profile.

1% Average Secant Flexural Modulus (ASC, or "Secant Flexural Modulus", or "Flex Mod"), is measured as specified by ASTM D-882.

Dart F50, or Dart Drop Impact or Dart Impact (DI), reported in grams (g) and/or grams per mil (g/µm), is measured as specified by ASTM D-1709, method B, using a dart with a phenolic composite head.

Example DTPs

Diene-terpolymer modifiers (DTP) (examples: DTP (1,7), DTP2, DTP3, and DTP (1,9)) were made in a continuous stirred-tank reactor operated in a solution process. The reactor was a 1.0-liter stainless steel autoclave reactor and was equipped with a stirrer, a water cooling/steam heating element with a temperature controller and a pressure controller. Solvents and monomers (e.g., ethylene, hexene and/or octene) were first purified by passing through columns of alumina and molecular sieves. The purified solvents and monomers were then chilled to below 4° C. by passing through a chiller before being fed into the reactor through a manifold. Ethylene was delivered as a gas solubilized in the chilled solvent/monomer mixture. Solvent and monomers were mixed in the manifold and fed into the reactor through a single port. All liquid flow rates were controlled and measured using Brooksfield mass flow controllers. 1,7-octadiene and 1,9-decediene were purified and then diluted with isohexane and fed into the reactor using a metering pump.

Rac-dimethylsilylbis(indenyl)zirconium dimethyl was pre-activated with N,N-dimethyl anilinium tetrakis (heptafluoro-2-naphthyl) borate at a molar ratio of about 1:1 in toluene. The pre-activated catalyst solution was kept in an inert atmosphere and was fed into the reactor using ISCO syringe pump through a separated line. Catalyst and monomer contacts took place in the reactor.

As an impurity scavenger, 200 ml of tri-n-octyl aluminum (TNOA) (25 wt % in hexane, Sigma Aldrich) was diluted in 22.83 kilogram of isohexane. The TNOA solution was stored in a 37.9-liter cylinder under nitrogen blanket. The solution was used for all polymerization runs until about 90% of consumption, and then a new batch was prepared. The feed rates of the TNOA solution were adjusted in a range from 0 (no scavenger) to 4 ml per minute to optimize catalyst activity.

The reactor was first prepared by continuously N2 purging at a maximum allowed temperature, then pumping isohexane and scavenger solution through the reactor system for at least one hour. Monomers and catalyst solutions were then fed into the reactor for polymerization. Once the activity was established and the system reached equilibrium, the reactor was lined out by continuing operation of the system under the established condition for a time period of at least four times of mean residence time prior to sample collection. The reactor effluent, containing mostly solvent, polymer and unreacted monomers, exited the reactor through a pressure control valve that reduced the pressure to atmospheric. This caused most of the unconverted monomers in the solution to flash into a vapor phase which was vented from the top of a sample collecting box. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 350 psig. The polymerization process condition and some characterization data are listed in Table 1. For each polymerization run, the catalyst feed rate and scavenger fed rate were adjusted to achieve a desired conversion listed in Table 1.

Film Compositions

64% DTP2 and 36% DTP3 were first mixed together and used as a modifier to improve film properties of mLLDPE. The mixture is referred as to as "DTP2-(1,9)" in this disclosure. Exceed™ Polyethylene 1018 ("Exceed 1018") is an mLLDPE (metallocene ethylene/hexene copolymer) available from ExxonMobil Chemical Company (Houston, Tex.), having an MI of 1.0 dg/min and a density of 0.918 g/cm$^3$. Polyethylene LD071.LR™ (also referred to as LDPE or LD071) is an LDPE available from ExxonMobil Chemical Company (Houston, Tex.) having an MI of 0.70 dg/min and a density of 0.924 g/cm$^3$. Enable™ 2005 polyethylene (also referred as Enable 2005 or "EN2005") is a metallocene ethylene-hexene copolymer having a melt index of 0.5 dg/min (ASTM D 1238, 2.16 kg, 190° C.) and density of 0.920 g/cm$^3$.

Compounding

The various DTPs were used as modifier to mLLDPE to improve the film blowing process and film properties. In each case, the chosen DTP was ground in a Wiley mill mixer and homogenized with an antioxidant package in a 1 inch Haake twin screw extruder. An antioxidant package was included that consisted of 15 wt % Irganox 1076™, 61 wt % Weston 399™ and 24 wt % of FXS92DA™. A blend composition was compounded with 1 wt % of DTP (by weight of the combined ingredients) produced in the examples described with Exceed™ 1018. The blends were prepared in a Coperion™ ZSK 57 mm twin screw extruder. Likewise, 5 wt % LDPE and 10 wt % Enable™ 2005 blends with Exceed 1018 were also prepared in the Coperion ZSK57 mm twin screw extruder for comparison.

Inventive Blown Film Process

The blown films were produced on a blown film line (Line I) having a 160 mm mono-layer die setting with a 90 mm grooved feed extruder. The adjustable air ring had a triple air lips and there is IBC (internal bubble cooling). It had 1 mil film, 2.5 blow-up ratio (BUR), 60 mil die gap and 14 inch (355 mm) air ring height "H". The blown film conditions and equipment setting are detailed in Table 2, where the air ring air temperature was 12° C., the surrounding temperature was 25-30° C.

TABLE 1

Synthesis Summary of DTPs

| Example Number | DTP(1,9) | DTP2 | DTP3 | DTP(1,7) |
|---|---|---|---|---|
| Polymerization temperature (° C.) | 130 | 130 | 130 | 130 |
| Ethylene feed rate (slpm) | 8 | 8 | 8 | 8 |
| Comonomer | 1-octene | 1-hexene | 1-hexene | 1-hexene |
| Comonomer feed rate (g/min) | 1.8 | 1.8 | 1.8 | 1.8 |
| α,ω-diene | 1,9-decadiene | 1,9-decadiene | 1,9-decadiene | 1,7-octadiene |
| α,ω-diene feed rate (ml/min) | 0.024 | 0.029 | 0.029 | 0.049 |
| Isohexane feed rate (g/min) | 55.2 | 57 | 64.7 | 55.2 |
| Polymer made (gram) | 2198 | 2553.5 | 1443 | 4793 |
| Conversion (%) | 84.4% | 87.2% | 88.7% | 88.7% |
| Ethylene content (wt %) | 90.9 | 88.7 | 89.7 | 88.9 |
| Tc (° C.) | 97.7 | 88.0 | 91.3 | 87.7 |
| Tm (° C.) | 114.3 | 108.5 | 108.3 | 106.6 |
| Heat of fusion (J/g) | 125.9 | 116.7 | 118.7 | 113.3 |
| Mn DRI (g/mol) | 34,573 | 31,951 | 32,372 | 35,720 |
| Mw DRI (g/mol) | 172,198 | 153,460 | 155,123 | 128,735 |
| Mz DRI (g/mol) | 587,828 | 514,216 | 594,848 | 418,163 |
| Mn LS (g/mol) | 58,716 | 45,814 | 41,495 | 40,400 |
| Mw LS (g/mol) | 277,712 | 236,287 | 203,845 | 157,907 |
| Mz LS (g/mol) | 1,453,627 | 1,175,659 | 999,196 | 717,895 |
| $g'_{vis}$ | 0.568 | 0.601 | 0.634 | 0.735 |
| $I_{21}$ (gram/10 min) | 0.13 | 0.99 | 1.22 | 2.24 |
| Complex shear viscosity at 0.1 rad/s (Pa s) | 311,000 | 189,000 | 172,000 | 117,000 |
| Complex shear viscosity at 100 rad/s (Pa s) | 1,743 | 1,545 | 1,469 | 1,293 |
| Phase angle at G* = 100,000 Pa (degree) | 21.0 | 25.1 | 24.9 | 27.5 |

TABLE 2

Representative Process Data for Inventive films produced on Line I Equipment

| Condition | Units | Value |
|---|---|---|
| Gauge (measured by lab) | Mil | 0.98 |
| Gauge 2σ | % | 4.6 |
| BUR |  | 2.5 |
| Lay Flat | In | 24.8 |
| Total Extrusion Rate | lbs/hr | 196.4 |
| Maximum Die Rate | lbs/hr-in | 9.9 to 20.0 |
| Frost Line Height | in (mm) | 30 (762) |
| Line Speed (primary nip) | Fpm | 168.3 |
| Extruder Speed | Rpm | 33.5 |
| Extruder Load | % | 53.3 |
| Specific Output | lb/hr/rpm | 5.86 |
| Air Ring Height | in (mm) | 14 (355) |
| Feed Throat Temperature | ° C. | 23.8 |
| Barrel Temperatures (1-6) | ° C. | 179 to 188 |
| Die Temperature | ° C. | 204 |
| Melt Temperature (¾" in) | ° C. | 214 |
| Melt Temperature (average) | ° C. | 212 |
| Melt Temperature at last barrel | ° C. | 210 |
| Melt Pressure at last barrel | Psi | 4,816 |
| Air Ring Speed | % | 28.5 |
| IBC Supply Speed | % | 38 |
| IBC Exhaust Speed | % | 41 |
| Air Ring Air Temp | ° C. | 12 |
| IBC Air Temp | ° C. | 33 |
| Exhaust air Temp | ° C. | 44 |

TABLE 3

Inventive Film 1-5 Properties at various Maximum Die Rates

| Parameter | 1 | 2 | 3 | 4 | 5 |
|---|---|---|---|---|---|
| Film Identity | Exceed 1018 | Exceed 1018 | 5 wt % LD071 + Exceed 1018 | 5 wt % LD071 + Exceed 1018 | 10 wt % Enable 2005 + Exceed 1018 |
| Maximum Die Rate (lb/hr-in) | 9.9 | 18.0 | 10.0 | 20.0 | 10.1 |
| Frost Line Height (in) | 30 | 51 | 28 | 44 | 28 |
| Gauge Mic (mils) | | | | | |
| Average | 0.99 | 1 | 0.98 | 0.99 | 1.03 |
| Low | 0.92 | 0.95 | 0.91 | 0.94 | 0.95 |
| High | 1.1 | 1.05 | 1.09 | 1.06 | 1.11 |
| 1% Flex Mod (psi) | | | | | |
| MD | 25,634 | 26,605 | 26,137 | 30,070 | 26,096 |
| TD | 28,427 | 31,005 | 28,768 | 34,448 | 28,392 |
| Tensile Yield Strength (psi) | | | | | |
| MD | 1,397 | 1,462 | 1,344 | 1,449 | 1,359 |
| TD | 1,312 | 1,372 | 1,433 | 1,505 | 1,396 |
| Elongation @ Yield (%) | | | | | |
| MD | 6.9 | 8 | 6.2 | 6.1 | 6 |
| TD | 5.9 | 5.4 | 6.3 | 5.7 | 8 |
| Tensile Strength (psi) | | | | | |
| MD | 8,363 | 8,447 | 7,685 | 8,350 | 10,571 |
| TD | 6,914 | 7,350 | 7,748 | 7,359 | 8,916 |
| Elongation @ Break (%) | | | | | |
| MD | 492 | 508 | 483 | 525 | 537 |
| TD | 589 | 655 | 604 | 656 | 629 |
| Elmendorf Tear | | | | | |
| MD (g) | 243 | 290 | 199 | 153 | 232 |
| TD (g) | 370 | 412 | 496 | 554 | 448 |
| MD (g/mil) | 246 | 284 | 199 | 153 | 232 |
| TD (g/mil) | 374 | 420 | 481 | 548 | 440 |
| Haze (%) | 6.4 | 11.9 | 2.5 | 3 | 3 |
| Gloss (GU) | | | | | |
| MD | 63 | 53 | 84 | 82 | 78 |
| TD | 66 | 55 | 85 | 83 | 80 |
| Dart Impact, Composite Method A | | | | | |
| (g) | 876 | 687 | 765 | 555 | 885 |
| (g/mil) | 885 | 687 | 781 | 561 | 859 |

TABLE 3-continued

Inventive Film 1-5 Properties at various Maximum Die Rates

| Parameter | 1 | 2 | 3 | 4 | 5 |
|---|---|---|---|---|---|
| Puncture, BTEC Method B | | | | | |
| Peak Force (lbs) | 12.8 | 13.3 | 11.8 | 11.6 | 14.9 |
| Peak Force (lbs/mil) | 12.9 | 13.3 | 12.1 | 11.7 | 14.5 |
| Break Energy (in-lbs) | 44.7 | 47.2 | 30.9 | 31.8 | 50.3 |
| Break Energy (in-lbs/mil) | 45.2 | 47.2 | 31.6 | 32.1 | 48.8 |

TABLE 4

Inventive Films 6-10 Properties at various Maximum Die Rate

| Parameter | 6 | 7 | 8 | 9 | 10 |
|---|---|---|---|---|---|
| Film Identity | 10 wt % Enable 2005 + Exceed 1018HA | 1 wt % DTP (1,7) + Exceed 1018HA | 1 wt % DTP (1,7) + Exceed 1018HA | 1 wt % DTP2-(1,9) + Exceed 1018HA | 1 wt % DTP2-(1,9) + Exceed 1018HA |
| Max Die Rate (lb/hr-in) | 20.0 | 10.0 | 20.0 | 10.0 | 20.0 |
| Frost Line Height (in) | 55 | 28 | 62 | 28 | 51 |
| Gauge Mic (mils) | | | | | |
| Average | 1.08 | 0.99 | 1.03 | 1.02 | 1.06 |
| Low | 1.03 | 0.92 | 0.95 | 0.9 | 0.95 |
| High | 1.12 | 1.07 | 1.1 | 1.11 | 1.14 |
| 1% Flex Mod (psi) | | | | | |
| MD | 28,472 | 25,823 | 28,925 | 26,986 | 29,892 |
| TD | 32,079 | 28,710 | 33,660 | 28,588 | 34,124 |
| Tensile Yield Strength (psi) | | | | | |
| MD | 1,389 | 1,338 | 1,434 | 1,360 | 1,457 |
| TD | 1,379 | 1,363 | 1,420 | 1,410 | 1,506 |
| Elongation @ Yield (%) | | | | | |
| MD | 6 | 6.6 | 6.4 | 6.1 | 6.4 |
| TD | 5.2 | 6.1 | 6.5 | 6.3 | 5.6 |
| Tensile Strength (psi) | | | | | |
| MD | 9,660 | 10,735 | 9,777 | 7,742 | 6,853 |
| TD | 8,235 | 9,224 | 8,094 | 7,885 | 7,558 |
| Elongation @ Break (%) | | | | | |
| MD | 550 | 538 | 525 | 472 | 488 |
| TD | 685 | 630 | 645 | 590 | 637 |
| Elmendorf Tear | | | | | |
| MD (g) | 267 | 206 | 228 | 199 | 219 |
| TD (g) | 521 | 396 | 423 | 394 | 455 |
| MD (g/mil) | 243 | 206 | 215 | 191 | 201 |
| TD (g/mil) | 501 | 385 | 423 | 382 | 434 |
| Haze (%) | 6.2 | 1.8 | 4 | 1.7 | 3.3 |
| Gloss (GU) | | | | | |
| MD | 68 | 87 | 77 | 88 | 79 |
| TD | 73 | 89 | 78 | 89 | 82 |
| Dart Impact, Composite Method A | | | | | |
| (g) | 639 | 1071 | 836 | 1011 | 821 |
| (g/mil) | 592 | 1082 | 811 | 991 | 774 |
| Puncture, BTEC Method B | | | | | |
| Peak Force (lbs) | 14 | 14.4 | 14.6 | 15 | 15.2 |
| Peak Force (lbs/mil) | 13 | 14.6 | 14.1 | 14.7 | 14.3 |
| Break Energy (in-lbs) | 47 | 49.6 | 51.5 | 52.5 | 53.7 |
| Break Energy (in-lbs/mil) | 43.5 | 50.1 | 50 | 51.5 | 50.7 |

Comparative Blown Film Process

Blown films of blends of LLDPE (Exceed™ 1018) and DTP(1,9) as well as a blend of LLDPE (Exceed 1018) and LD071 were prepared as comparative examples for blown film process. The comparative examples were achieved in a blown film line with a traditional fixed cooling ring against the die (blown film Line II) so that "H" is zero, which has a 2.5" extruder of L/D of 30:1. Line II was equipped with a 6" mono-layer die and dual lip air ring. The die was able to rotate to provide a more uniform melt distribution. During the process, the bubble passed through a bubble cage to be stabilized. Then bubble to be flattened into a sheet after passing a collapsing frame. Then the sheet travels through primary nip and secondary nip which control and provide the desired film tension, line speed and gauge at a given extrusion rate. Then the sheet was wound into a roll in a film winder. Process conditions are summarized in Table 5, and the results of the film production outlined in Table 6.

TABLE 5

Representative Process Data for Comparative films produced on Line II Equipment

| Condition | Units | Value |
|---|---|---|
| Horse Power | HP | 21.7 |
| Extruder Melt Temperature | ° C. | 207 |
| Extruder Pressure | psi | 4,200 |
| BUR | | 2.5 |
| Extruder Motor Load | % | 66.6 |
| Extruder RPM | rpm | 61.5 |
| Line Speed | ft/min | 167 |
| Extrusion Rate | lb/hr | 188 |
| Frost Line Height | in (mm) | 19-24 (483-586) |
| Maximum Die Rate | lb/hr-in | 10.0-13.0 |
| Maximum Line Speed | ft/min | 201 |
| Maximum Extrusion Rate | lb/hr | 226 |
| Maximum Line Speed | % | 120% |
| Maximum Line Speed Increase | % | 20% |

TABLE 6

Comparative Film Properties

| Sample | C1 | C2 | C3 | C4 | C5 | C6 |
|---|---|---|---|---|---|---|
| Film Identity | Exceed 1018 | 5 wt % LD071 + Exceed 1018 | Exceed 1018 | Exceed 1018 | 1 wt % DTP(1, 9) + Exceed 1018 | 2 wt % DTP(1, 9) + Exceed 1018 |
| Maximum Die Rate (lb/hr-in) | 12.0 | 12.5 | 11.0 | 12.9 | 13.0 | 12.8 |
| 1% Flex Mod (psi) | | | | | | |
| MD | 24,049 | 28,503 | 25,842 | 27,395 | 29,007 | 34,072 |
| TD | 28,506 | 35,317 | 29,355 | 30,765 | 37,376 | 43,555 |
| Tensile Yield Strength (psi) | | | | | | |
| MD | 1,361 | 1,421 | 1,303 | 1,341 | 1,410 | 1,592 |
| Elongation @ Yield (%) | | | | | | |
| MD | 7.1 | 6.1 | 6.4 | 6.1 | 6.3 | 6.3 |
| TD | 6.6 | 7.2 | 7.3 | 6.3 | 7.6 | 6.4 |
| Tensile Strength (psi) | | | | | | |
| MD | 9,473 | 9,572 | 7,428 | 7,989 | 9,153 | 10,168 |
| TD | 8,308 | 8,052 | 6,661 | 6,624 | 7,806 | 7,358 |
| Elongation @ Break (%) | | | | | | |
| MD | 512 | 521 | 468 | 465 | 457 | 422 |
| TD | 665 | 662 | 610 | 610 | 664 | 628 |
| Elmendorf Tear | | | | | | |
| MD (g) | 256 | 138 | 238 | 226 | 292 | 87 |
| TD (g) | 430 | 522 | 405 | 418 | 466 | 499 |
| MD (g/mil) | 250 | 136 | 243 | 226 | 292 | 89 |
| TD (g/mil) | 430 | 522 | 405 | 423 | 466 | 509 |
| Haze (%) | 16.5 | 2.4 | 12.8 | 8.5 | 3.2 | 1.9 |
| Dart Impact/Composite Dart Head - Method A | | | | | | |
| (g/mil) | 911 | 647 | 921 | 821 | 871 | 524 |
| Puncture, ASTM Probe A | | | | | | |
| Maximum Force (lbs) | 8 | 9 | — | — | — | — |
| Maximum/mil Force (lbs/mil) | 8 | 8.9 | — | — | — | — |
| Break Energy (in-lbs) | 21.18 | 19.21 | — | — | — | — |
| Break Energy/mil (in-lbs/mil) | 21.18 | 19.21 | — | — | — | — |
| Gauge Mic (mils) | | | | | | |
| Average | 1.00 | 1.00 | 0.99 | 0.97 | 0.99 | 0.97 |
| Low | 0.93 | 0.93 | 0.92 | 0.90 | 0.94 | 0.92 |
| High | 1.08 | 1.11 | 1.05 | 1.01 | 1.03 | 1.04 |

The maximum rate is controlled in part by the "bubble stability" of the forming film. When the line speed/extrusion rate is over the maximum rate, the bubble formed by the film being blown by air becomes unstable. The bubble stability is related two main factors:

3. Melt strength of the polymer blend: higher the melt strength, higher the maximum rate. The addition of small amount of the diene terpolymer (DTP) enhances the melt strength of the base polyethylene significantly. Hence the DTP blend have higher maximum rate than the base polyethylene (Exceed 1018).
4. Cooling capability of the line: higher cooling capability, higher the maximum rate. The Line I line has higher cooling capability than Line II.

Typically, the Maximum Die Rate is used to normalize the extrusion rate. For the Line II, the Maximum Die Rate for 1 wt % DTP or 5 wt % LD was about 13 to 13.5 lb/in-hr. On the Line I, these same blends can be formed at a Maximum Die Rate of at least 18 to 20 lbs/in-hr.

Figure 4:
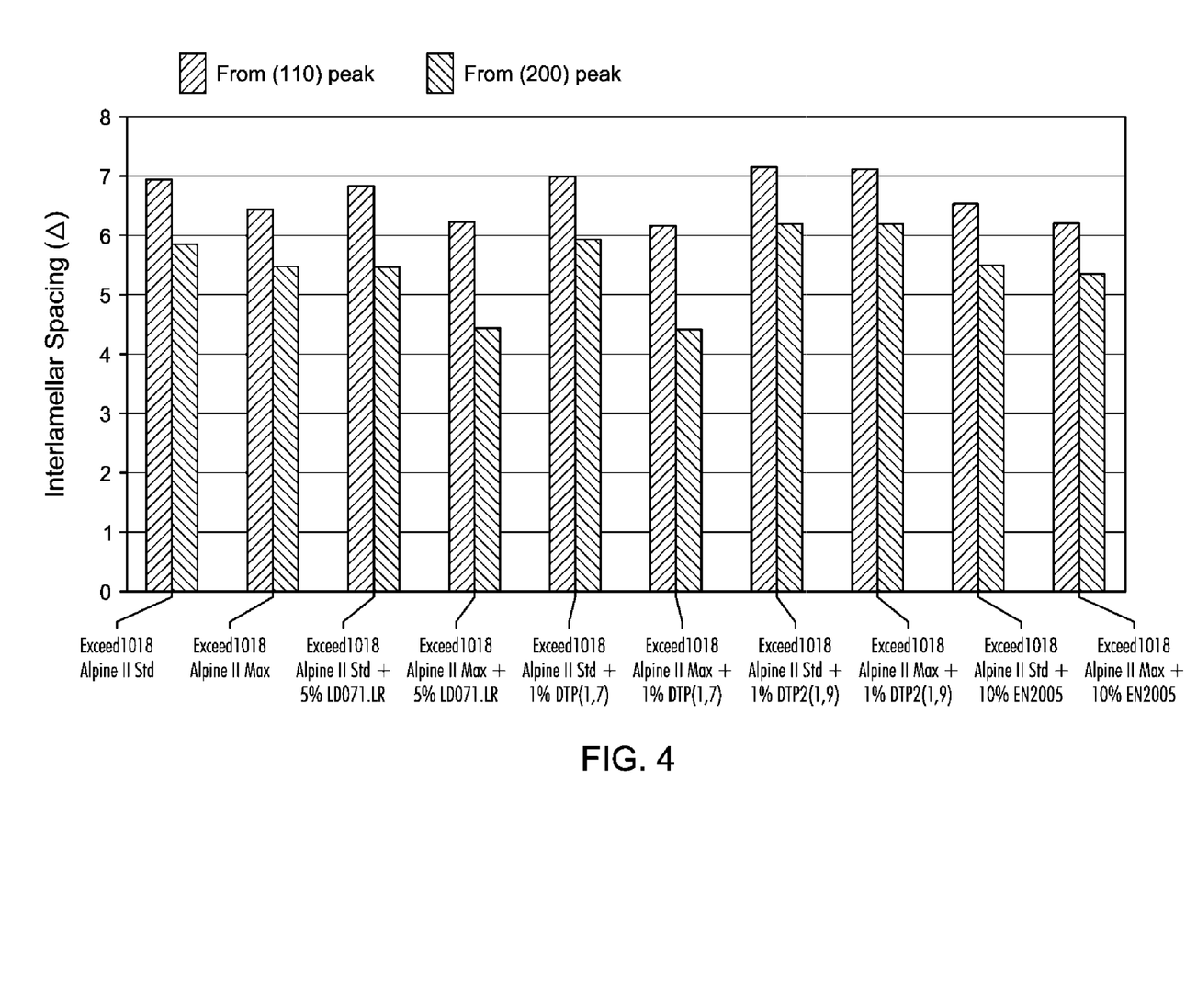
FIG. 4 is a chart showing the crystal size of various blown polyethylene films at various conditions and compositions, where the y-axis is the inter-lamellar spacing.
Figure 5:
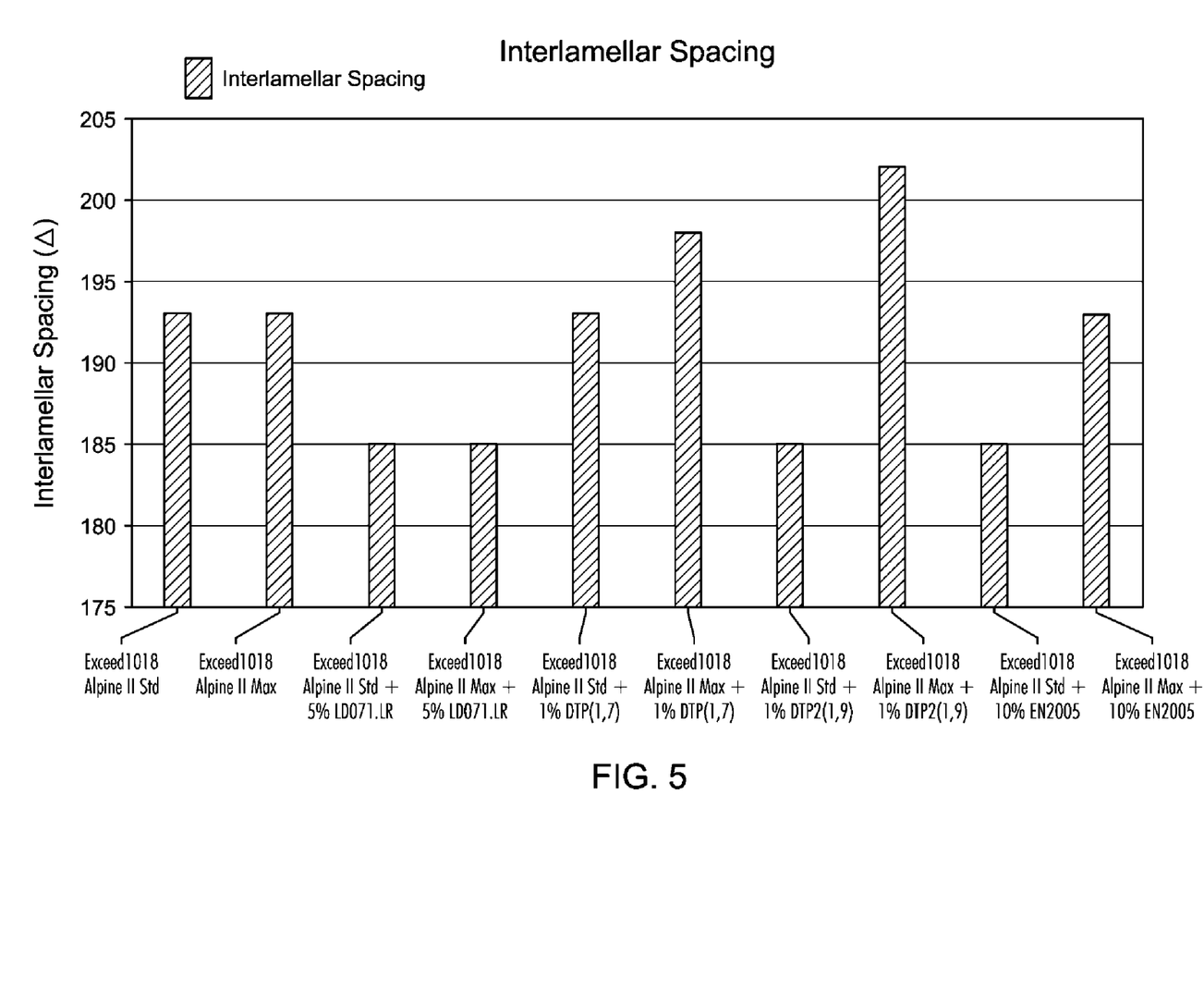
FIG. 5 is a chart showing the inter-lamellar spacing of various blown polyethylene films at various conditions and compositions.

In FIGS. 2 and 3, each symbol, whether filled or open, represents the same composition. In FIGS. 2 and 3, the filled black symbols represent the use of a traditional, prior art cooling device positioned against the die, wherein the open symbols represent the inventive process of having the cooling device a distance from the die of 14 inches (see Table 2). FIG. 2 illustrates the film MD-Elmendorf tear as a function of film microstructure parameters: Herman's orientation function (lamellar) percent crystallinity and inter lamellar spacing; while FIG. 3 elucidate the film stiffness measure by 1% MD secant as a function of the above mentioned three parameters. In FIG. 3, the open diamond refers to "1% DTP (1,7), as it does in FIG. 2, and "+" inside box or alone is meant to be 10% Enable 2005 at 18-20 lb/in-hr, as it is in FIG. 2. The crystallinity data and inter lamellar spacing data (y-axis) are in FIGS. 4 and 5 as bar graphs for illustrative purposes.

Now, having described the various features of the inventive process and finished films resulting therefrom, described here in numbered paragraphs is:

P1. A method of forming a finished film comprising (or consisting essentially of, or consisting of):
   extruding a molten polyethylene comprising a diene terpolymer modifier through a die opening to form a film, wherein the diene-terpolymer modifier is a terpolymer comprising ethylene-derived units, $C_3$ to $C_{10}$ α-olefin derived units, and diene-derived units;
   causing the film to progress in a direction away from the die opening;
   cooling the film at a distance from the die opening, the distance adjusted to effect the properties of the film; and
   isolating a finished film therefrom.
P2. The method of numbered paragraph 1, wherein the resulting finished film meets the following relationship:

ETMD+0.103$f_H$·χΔ>200 (g/mil); or

ETMD+0.103$f_H$·χΔ>240 (g/mil); or

ETMD+0.103$f_H$·χΔ>280 (g/mil); and,

SCMD−2.62$f_H$·χΔ>21,000 (psi); or

SCMD−2.62$f_H$·χΔ>22,000 (psi); or

SCMD−2.62$f_H$·χΔ>23,000 (psi);

wherein "ETMD" is MD Elmendorf tear (g/mil); SCMD is the MD 1% Secant (psi); $f_H$ is the Herman Orientation Function (lamella); χ is percent crystallinity; and Δ is inter-lamellar spacing (Δ).
P3. The method of numbered paragraphs 1 or 2, wherein the polyethylene is a linear low density polyethylene having a density within the range from 0.850 g/cm³ to 0.930 g/cm³. And wherein the polyethylene is a linear low density polyethylene having a melt index (190/2.16) within the range from 0.40 or 0.60 or 0.80 g/10 min to 1.20 or 1.40 or 1.60 or 2.00 or 4.00 g/10 min.
P4. The method of any one of the previous numbered paragraphs, wherein the polyethylene also comprises within the range from 0.10 wt % to 10 wt % of a diene-terpolymer modifier.
P5. The method of numbered paragraph 4, wherein the diene-terpolymer modifier is a terpolymer comprising ethylene-derived units, $C_3$ to $C_{10}$ α-olefin derived units, and diene-derived units; wherein the diene is preferably an alpha-omega linear diene.
P6. The method of numbered paragraph 5, wherein the diene terpolymer comprises ethylene-derived units and within a range from 0.01 wt % to 10.0 wt % diene derived units, and 1.0 wt % to 20 wt % of $C_4$ to $C_{10}$ α-olefin derived units based on the weight of the diene terpolymer, wherein the diene terpolymer has:
   a) a $g'_{vis}$ of less than 0.90;
   b) an $M_w$ within a range of from 70,000 g/mol to 300,000 g/mol;
   c) an $M_w/M_n$ within the range of from 3.0 to 12; and
   d) an $M_z/M_n$ of greater than 14.0.
P7. The method of any one of the previous numbered paragraphs, wherein the distance is within a range of from 1, or 2, or 4, or 8 cm to 50 cm, or 60 cm, or 80 cm, or 3 meters.
P8. The method of any one of the previous numbered paragraphs, wherein the cooling is provided by air blown on at least a portion of the film, preferably around the complete circumference of the film when blown into a hollow tube, the temperature of the air at least 10° C. cooler than the surrounding temperature. Preferably, the cooling air is at a temperature within the range from 5 or 10° C. to 15 or 20 or 25° C.; and preferably the surrounding temperature is within a range from 20 or 30° C. to 50 or 60° C.
P9. The method of any one of the previous numbered paragraphs, wherein the film is formed at a Maximum Die Rate within a range from 13, or 15, or 18, or 22 lb/in-hr to 26 or 30 or 40 lb/in-hr.
P10. The method of any one of the previous numbered paragraphs, wherein the film is formed at a Maximum Rate within a range from 350 lb/hr to 500 lb/hr.
P11. The method of numbered paragraph 4, wherein the MD Tensile Strength of the finished film is within a range from 8000 psi (55 MPa) to 16,000 psi (110 MPa).
P12. The method of numbered paragraph 4, wherein the MD Elongation of the finished film is within a range from 480% to 680%.
P13. The method of numbered paragraph 4, wherein the Haze (ASTM D1003) of the finished film is less than 6 or 4%.
P14. The method of any one of the previous numbered paragraphs, wherein the die opening is in the form of a ring and the molten polyethylene emanating therefrom is in the form of a continuous tube.
P15. The method of any one of the previous numbered paragraphs, wherein the finished film has a thickness within the range from 10 or 15 μm to 50 or 75 or 100 μm.

P16. The method of any one of the previous numbered paragraphs, wherein the distance is the ratio of H/D and is a value within a range from 0.1 or 0.5 or 1 to 2 or 3 or 4 or 5.

P17. A polyethylene blown film having a MD Tensile Strength of the finished film is within a range from 6000 psi (41 MPa) to 16,000 psi (110 MPa) comprising (or consisting essentially of, or consisting of):
a linear low density polyethylene having a density within the range from 0.850 g/cm$^3$ to 0.930 g/cm$^3$ and within the range from 0.10 wt % to 10 wt % of a diene-terpolymer modifier;
wherein the diene terpolymer modifier comprises ethylene-derived units and within a range from 0.01 wt % to 10.0 wt % diene derived units, and 1.0 wt % to 20 wt % of $C_4$ to $C_{10}$ α-olefin derived units based on the weight of the diene terpolymer, wherein the diene terpolymer has:
a) a $g'_{vis}$ of less than 0.90;
b) an $M_w$ within a range of from 70,000 g/mol to 300,000 g/mol;
c) an $M_w/M_n$ within the range of from 3.0 to 12; and
d) an Mz/Mn of greater than 14.0.

P18. The polyethylene blown film of numbered paragraph 17, achieved at a Maximum Die Rate within a range from 13, or 15, or 18, or 22 lb/in-hr to 26 or 30 or 40 lb/in-hr.

P19. The polyethylene blown film of numbered paragraph 17 or 18, wherein the diene is selected from 5-vinyl-2-norbornene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene derived units.

P20. The polyethylene blown film of any one of numbered paragraphs 17-19, wherein the linear low density polyethylene has a melt index (190/2.16) within the range from 0.20 g/10 min to 10.0 g/10 min.

P21. The polyethylene blown film of any one of numbered paragraphs 17-20, wherein the linear low density polyethylene has a $g'_{vis}$ of greater than 0.90.

Also disclosed herein is the use of a blown film line to form a finished film by extruding a molten polyethylene comprising a diene terpolymer modifier through a die opening to form a film, wherein the diene-terpolymer modifier is a terpolymer comprising ethylene-derived units, $C_3$ to $C_{10}$ α-olefin derived units, and diene-derived units; causing the film to progress in a direction away from the die opening; cooling the molten polyethylene in the form of a film at a distance from the die opening, the distance adjusted to allow relaxation of the molten polyethylene prior to solidification and/or crystallization upon cooling; and isolating a finished film therefrom. The polyethylene may be characterized by any one or combination of features described herein.

The phrase "consisting essentially of" in a film means that no other additives (additional polymers and/or antioxidants, antistatic agents, antislip agents, fillers) are present in the composition being referred to other than those named, or, if present, are present to a level no greater than 0.5, or 1.0, or 2.0, or 4.0 wt % by weight of the composition; and in a process, "consisting essentially of" means that no other major process step is present or effects the claimed film properties such that the value would be outside the claim scope.

For all jurisdictions in which the doctrine of "incorporation by reference" applies, all of the test methods, patent publications, patents and reference articles are hereby incorporated by reference either in their entirety or for the relevant portion for which they are referenced, including the priority document(s).

The invention claimed is:

1. A polyethylene blown film having a MD Tensile Strength of the finished film is within a range from 6000 psi (41 MPa) to 16,000 psi (110 MPa) comprising:
a linear low density polyethylene having a density within the range from 0.850 g/cm$^3$ to 0.930 g/cm$^3$ and within the range from 0.10 wt % to 10 wt % of a diene-terpolymer modifier;
wherein the diene terpolymer modifier comprises ethylene-derived units and within a range from 0.01 wt % to 10.0 wt % diene derived units, and 1.0 wt % to 20 wt % of $C_4$ to $C_{10}$ α-olefin derived units based on the weight of the diene terpolymer, wherein the diene terpolymer has:
a) a $g'_{vis}$ of less than 0.90;
b) an $M_w$ within a range of from 70,000 g/mol to 300,000 g/mol;
c) an $M_w/M_n$ within the range of from 3.0 to 12; and
d) an $M_z/M_n$ of greater than 14.0.

2. The polyethylene blown film of claim 1, is achieved at a Maximum Die Rate of at least 13 lb/in-hr.

3. The polyethylene blown film of claim 1, wherein the diene is selected from 5-vinyl-2-norbornene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene derived units.

4. The polyethylene blown film of claim 1, wherein the linear low density polyethylene has a melt index (ASTM D 1238 190° C., 2.16 kg) within the range from 0.20 g/10 min to 10.0 g/10 min.

5. The polyethylene blown film of claim 1, wherein the linear low density polyethylene has a $g'_{vis}$ of greater than 0.90.

* * * * *